United States Patent
Zhou et al.

(10) Patent No.: US 11,315,034 B2
(45) Date of Patent: Apr. 26, 2022

(54) INTELLIGENT BIG DATA SYSTEM, AND METHOD AND APPARATUS FOR PROVIDING INTELLIGENT BIG DATA SERVICE

(71) Applicant: BEIJING BAIDU NETCOM SCIENCE AND TECHNOLOGY CO., LTD., Haidian District Beijing (CN)

(72) Inventors: Kai Zhou, Beijing (CN); Qian Wang, Beijing (CN); Faen Zhang, Beijing (CN); Kun Liu, Beijing (CN); Yuanhao Xiao, Beijing (CN); Dongze Xu, Beijing (CN); Tianhan Xu, Beijing (CN); Jiayuan Sun, Beijing (CN); Lan Liu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 910 days.

(21) Appl. No.: 16/118,197

(22) Filed: Aug. 30, 2018

(65) Prior Publication Data
US 2019/0087383 A1 Mar. 21, 2019

(30) Foreign Application Priority Data
Sep. 19, 2017 (CN) .......................... 201710851941.X

(51) Int. Cl.
*G06F 3/00* (2006.01)
*G06N 20/00* (2019.01)
(Continued)

(52) U.S. Cl.
CPC .......... *G06N 20/00* (2019.01); *G06F 9/4881* (2013.01); *G06F 9/5027* (2013.01); *G06F 9/54* (2013.01);
(Continued)

(58) Field of Classification Search
CPC ................................ G06K 9/6256; G06F 9/54
(Continued)

(56) References Cited

U.S. PATENT DOCUMENTS

| 7,640,145 B2 | 12/2009 | Wegerich et al. |
| 8,438,122 B1* | 5/2013 | Mann ..................... G06N 20/00 |
| | | 706/12 |

(Continued)

FOREIGN PATENT DOCUMENTS

| CN | 103502899 A | 1/2014 |
| CN | 104123182 A | 10/2014 |

(Continued)

OTHER PUBLICATIONS

Shuhan Yuan, A Two Phase Deep Learning Model for Identifying Discrimination from Tweets. (Year: 2016).*

(Continued)

*Primary Examiner* — Lechi Truong
(74) *Attorney, Agent, or Firm* — Brooks Kushman P.C.

(57) ABSTRACT

A system comprises: a data warehouse, a storage device and a cluster including a plurality of computing nodes; the data warehouse is configured to store task data obtained from the user; at least one computing node in the cluster includes a resource scheduling component, and is configured to perform resource scheduling for the task and determine a computing node executing the task; the computing node executing the task comprises a model training component and/or a prediction component; the model training component is configured to, according to task data, invoke a corresponding type of learning model from the storage device; use sample data and training target included in the task data to train the learning model, to obtain the prediction model corresponding to the task and store the prediction model in the storage device; the prediction component is (Continued)

configured to obtain a prediction result output by the prediction model.

16 Claims, 3 Drawing Sheets

(51) Int. Cl.
*G06F 9/48* (2006.01)
*G06K 9/62* (2022.01)
*G06F 9/54* (2006.01)
*G06F 16/28* (2019.01)
*G06F 9/50* (2006.01)

(52) U.S. Cl.
CPC ......... *G06F 16/283* (2019.01); *G06K 9/6256* (2013.01)

(58) Field of Classification Search
USPC .......................................... 719/310; 706/16
See application file for complete search history.

(56) References Cited

U.S. PATENT DOCUMENTS

2014/0025354 A1* 1/2014 Padullaparthi ......... G06N 20/00 703/2
2018/0367480 A1* 12/2018 Housman .............. G06F 40/216

FOREIGN PATENT DOCUMENTS

| | | |
|---|---|---|
| CN | 105808500 A | 7/2016 |
| CN | 106961359 A | 7/2017 |

OTHER PUBLICATIONS

Chinese Office Action dated Mar. 31, 2020, for related Chinese Appln. No. 201710851941X; 7 Pages.
Chinese Search Report dated Mar. 22, 2020 for related Chinese Appln. No. 201710851941X; 3 Pages.

* cited by examiner

INTELLIGENT BIG DATA SYSTEM, AND METHOD AND APPARATUS FOR PROVIDING INTELLIGENT BIG DATA SERVICE

The present application claims the priority of Chinese Patent Application No. 201710851941.X, filed on Sep. 19, 2017, with the title of "Intelligent big data system, and method and apparatus for providing intelligent big data service". The disclosure of the above applications is incorporated herein by reference in its entirety.

FIELD OF THE DISCLOSURE

The present disclosure relates to the technical field of computer application, and particularly to an intelligent big data system, and a method and apparatus for providing intelligent big data service.

BACKGROUND OF THE DISCLOSURE

Big data and artificial intelligence technologies have developed rapidly in recent years. In either newly-arising industries or conventional industry, more and more enterprises have already made better business analysis and decision by virtue of big data and artificial intelligence technologies. A "big data+train+predict" application mode prevails increasingly.

Utilizers of intelligent big data mostly have a capability of providing certain sample data. However, if the utilizer himself builds a software and hardware platform for model training and prediction, he needs to understand deep learning algorithm and software and hardware architecture very well, which imposes very high requirements for knowledge level of the utilizer on the one hand; on the other hand, development costs caused by so doing are also very high.

SUMMARY OF THE DISCLOSURE

In view of the above, the present disclosure provides an intelligent big data system, and a method and apparatus for providing intelligent big data service, to reduce requirements for knowledge levels of intelligent big data utilizers and development costs.

Specific Technical Solutions are as Follows:

The present disclosure provides an intelligent big data system, the system comprising: a data warehouse, a storage device and a cluster including a plurality of computing nodes;

the data warehouse is configured to store task data obtained from a user;

at least one computing node in the cluster includes a resource scheduling component, and is configured to perform resource scheduling for the task and determine a computing node executing the task;

the computing node executing the task comprises a model training component and/or a prediction component;

the model training component is configured to, according to task data, invoke a corresponding type of learning model from the storage device; use sample data and training target included in the task data to train the learning model, to obtain the prediction model corresponding to the task and store the prediction model in the storage device;

the prediction component is configured to invoke a corresponding type of prediction model from the storage device based on the task data; input prediction data included in the task data into the prediction model, to obtain a prediction result output by the prediction model.

According to a specific implementation mode of the present disclosure, the storage device comprises: a distributed storage system.

According to a specific implementation mode of the present disclosure, the computing nodes in the cluster comprise: a master node and slave nodes;

the resource scheduling component is located at the master node;

the model training component and/or prediction component are located at the slave nodes.

According to a specific implementation mode of the present disclosure, the slave nodes further comprise: an agent component for registering information of the slave node to the master node.

According to a specific implementation mode of the present disclosure, the computing nodes comprise: one of CPU, Graphics Processing Unit GPU and Field-Programmable Gate Array FPGA or any combination thereof.

According to a specific implementation mode of the present disclosure, a Linux operating system is run and a Python interface library is provided on the computing nodes.

The present disclosure further provides a method of providing intelligent big data service, the method comprising:

obtaining a user's task data;

performing resource scheduling for the task in a cluster comprised of a plurality of computing nodes, and determining a computing node executing the task;

executing the task on the computing node comprises:

according to task data, invoking a corresponding type of learning model from the storage device; using sample data and training target included in the task data to train the learning model, to obtain the prediction model corresponding to the task and store the prediction model in the storage device; and/or, invoking a corresponding type of prediction model from the storage device based on the task data; inputting prediction data included in the task data into the prediction model, to obtain a prediction result output by the prediction model.

According to a specific implementation mode of the present disclosure, after the user logs in, the master node in the cluster activates ambari service, and perform the following operations for components in the cluster through REST API:

wait for an agent component on the slave nodes in the cluster to register information of the slave nodes to the master node;

install and activate a Hadoop Distributed File System HDFS component and a resource scheduling component.

According to a specific implementation mode of the present disclosure, the obtaining a user's task data comprises: obtaining the task data from the user's service system through the REST API;

the method further comprises: returning the prediction result to the user's service system through the REST API.

According to a specific implementation mode of the present disclosure, the invoking a corresponding type of prediction model from the storage device based on the task data comprises:

invoking, from the storage device, a deep learning model of a type designated by the task data; or, according to a pre-configured correspondence relationship between applications and deep learning model types, invoking from the storage system a type of deep learning model corresponding to application information included by the task data.

According to a specific implementation mode of the present disclosure, training of the learning model is performed on CPU or FPGA resource in the computing nodes.

The present disclosure further provides a device, the device comprising:

one or more processors;

a storage for storing one or more programs;

the one or more programs, when executed by said one or more processors, enable said one or more processors to implement the above-mentioned method.

The present disclosure further provides a storage medium including computer executable instructions, wherein the computer executable instructions, when executed by a computer processor, implement the abovementioned method.

As can be seen from the above technical solutions, the present disclosure provides the user with a unitary and uniform intelligent big data platform, and the user may achieve model training and prediction on the intelligent big data platform by only needing to provide his own sample data, thereby reducing requirements for knowledge levels of intelligent big data utilizers and development costs, and well satisfying demands for application of intelligent big data.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when (stated condition or event) is detected" or "responsive to detecting (stated condition or event)".

Figure 1:
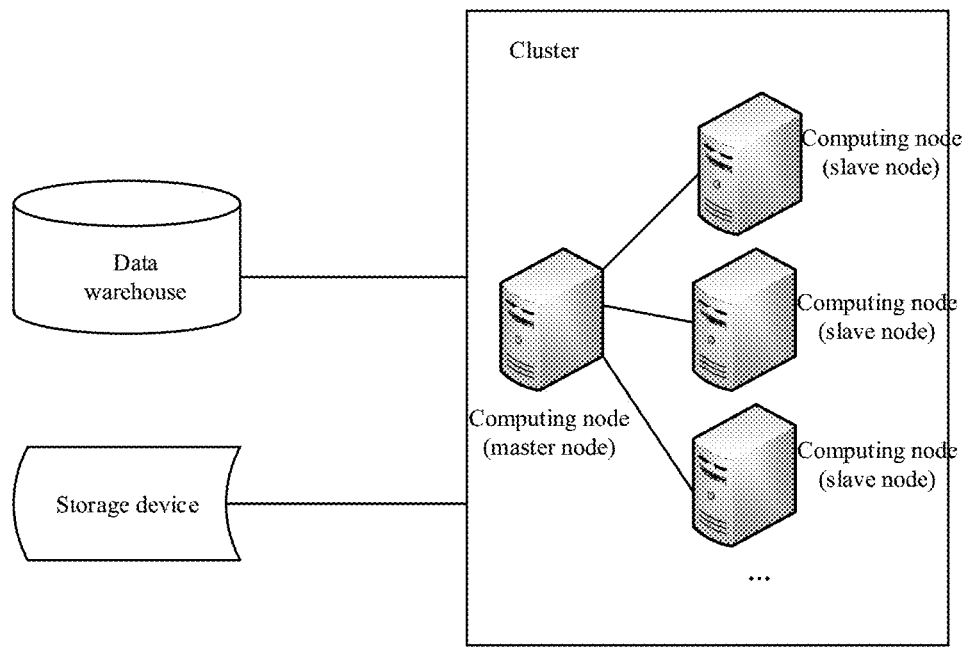
FIG. 1 is a structural diagram of an entity of an intelligent big data system according to an embodiment of the present disclosure.

As shown in FIG. 1, an intelligent big data system according to the present disclosure, from perspective of entity, mainly comprises: a data warehouse, a storage device and a cluster including a plurality of computing nodes.

The data warehouse is responsible for storing task data obtained from the user, wherein the task data may include sample data and a training target, and/or, the task data may include prediction data, wherein the sample data and training target are used for model training, and the prediction data is used for prediction. In addition, the task data may further comprise other data, which will be involved subsequently.

The storage device may be of distributed storage or other storage types, and used to store a learning model, and train the obtained prediction model.

The cluster comprises a plurality of computing nodes which are responsible for executing model training and prediction processing.

At least one computing node of the cluster includes a resource scheduling component, and is responsible for performing resource scheduling for the task and determining a computing node executing the task.

The computing node executing the task may comprise a model training component and/or a prediction component.

The model training component is responsible for, according to task data, invoking a corresponding type of learning model from the storage device; using sample data and training target included in the task data to train the learning model, to obtain the prediction model corresponding to the task and store the prediction model in the storage device;

The prediction component is responsible for, based on the task data, invoking a corresponding type of prediction model from the storage device; inputting prediction data included in the task data into the prediction model, to obtain a prediction result output by the prediction model.

As a preferred implementation mode, the cluster may comprise a master node and slave nodes. The resource scheduling component is located on the master node which schedule resources of the slave nodes for the task. The slave nodes perform specific task processing. The master node may also perform a specific processing task.

Figure 2:
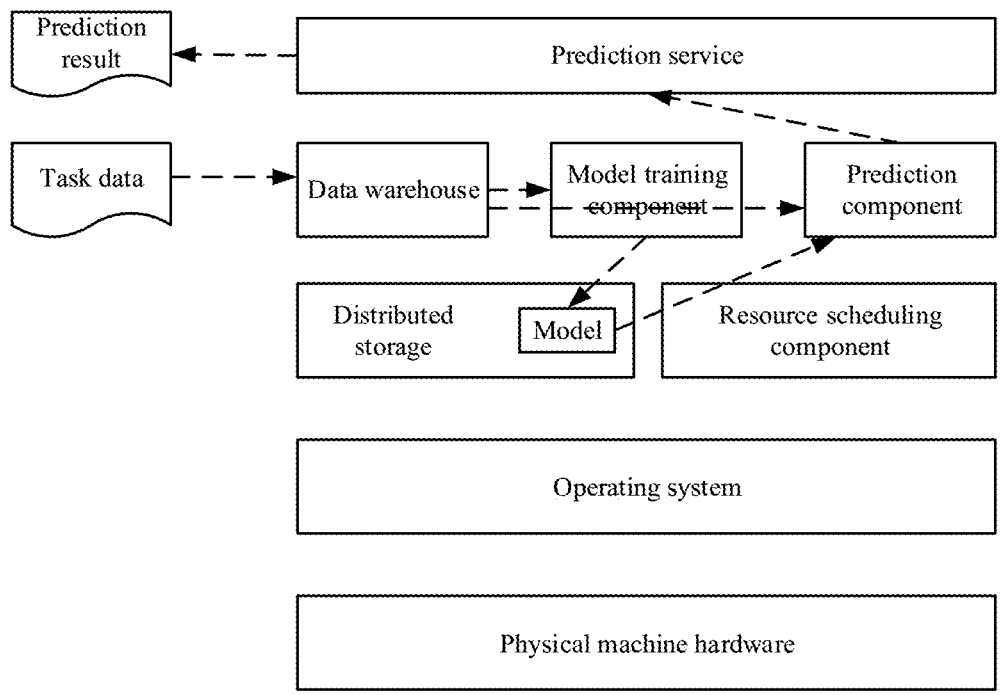
FIG. 2 is a structural diagram of an architecture of an intelligent big data system according to an embodiment of the present disclosure.

The above system according to the embodiment of the present disclosure, as shown in FIG. 2, may be described with the following portions in more detail.

The First Portion: Physical Machine Hardware

In embodiments of the present disclosure, it is possible to select the type of hardware for computing nodes according to intelligent big data application, including but not limited to heterogeneous hardware such as CPU, GPU and FPGA, i.e., a computing node may be configured with one resource in CPU, GPU and FPGA or any combination thereof. Hardware further comprises other types of hardware such as memory, power source, rack and cabinet. Estimation is performed for the utilizer's data scale to determine the number of hardware. For example, one of the computing nodes is configured with two 12-core CPU, 192 GB memory, 8 GPU cards, 8 6TB-HDD hard drives. The power source, cabinet and rack may be configured according to computer room requirements.

The Second Portion: an Operating System and Software Environment

A customized operating system, hardware drive and necessary software environment are deployed on the basis of hardware. Since a commonly-used deep learning framework usually runs on a Linux system, it is possible to run the Linux operating system and provide a Python interface library on the computing nodes. For example, it is possible to install CentOS 7.2 operating system, and configure python 2.7 and JDK (software development kit of Java language) 1.7 environment.

The Third Portion: Big Data Environment

The big data environment in the embodiment of the present disclosure mainly comprises a distributed storage, a resource scheduling component and a data warehouse.

The data warehouse is used to store training data obtained from the user through a REST (Representational State Transfer) APi. The data warehouse is used to store various learning models and prediction model obtained by training the learning model with training data.

The resource scheduling component may be located at the master node in the cluster and responsible for task allocation and resource scheduling. That is, proper computing nodes are allocated according to resource occupation situations of computing nodes to execute the task. The resource scheduling component need to be capable of recognizing and allocating heterogeneous computing resources such as CPU, GPU and FPGA.

In the embodiment of the present disclosure, the big data environment may manage configuration and operation of components of the cluster through remote control. Specifically, the user may remotely log in the intelligent big data system. The master node in the cluster, after the user logs in, activates ambari service (ambari is a Web-based tool, supports supply, management and monitoring of an Apache Hadoop cluster, and currently supports most Hadoop components), and perform the following operations for the components in the cluster through the REST API:

1) Wait for an agent component on the slave nodes in the cluster to register information of the slave nodes to the master node. The registered slave node information may include for example a slave node ID, a slave node resource type, slave node resource occupation situations and so on.

2) install and activate a HDFS (Hadoop Distributed File System) component and the resource scheduling component, wherein the resource scheduling component may employ a YARN (Yet Another Resource Negotiator) component. YARN is a new Hadoop resource manager, it is a general-purpose resource management system, and may provide uniform resource management and scheduling for an upper-layer application. Introduction of YARN brings about large benefits to aspects such as utilization rate, resource uniform management and data sharing.

The utilizer (user) activates the cluster, namely, may use the intelligent big data service to achieve an open-and-use effect.

Without interrupting already-running tasks in the cluster, the big data environment increases the slave node and thereby improves the computing capability and storage capability of the cluster.

The Fourth Portion: Deep Learning Platform

The resource scheduling component may run the deep learning program on resources such as CPU, GPU or FPGA, preferably GPU or FPGA, and its running efficiency is usually tens of times or hundreds of times higher than the CPU.

The deep learning program may be provided by the user. It is also possible to use a deep learning program pre-configured in the intelligent big data system, and the user provides a training target.

The model training component obtains the task data from the data warehouse. In the task data, the user already designates a specific type of deep learning model. The model training component may directly invoke, from the storage device, the deep learning model of a type designated by the task data.

There is also another implementation mode. In the intelligent big data system is already configured a correspondence relationship between applications and deep learning types, that is to say, corresponding preferred deep learning types are already configured for various commonly-used applications. The user may only include application information in the training data. The model training component, according to the pre-configured correspondence relationship between the applications and deep learning model types, invoke from the storage system a type of deep learning model corresponding to application information included by the task data.

After the model training component uploads the deep learning model, sample data are used to train the deep learning model, to obtain the prediction model and store it in the distributed storage for subsequent use in prediction. In addition, the model training component may further use user-provided new training data to persistently perform model training, namely, update already-trained prediction model and thereby improve the prediction effect.

The Fifth Portion: Prediction Service

The prediction component may provide the REST API. The user provides prediction task data such as prediction data, prediction program and prediction model type, through the REST API. The REST API helps the user to interface his own service system with the intelligent big data platform.

Likewise, the prediction program may be provided by the user, or may employ a prediction program pre-configured in the intelligent big data system.

The prediction component invokes a duly-trained prediction model from the storage device according to the task data, and then inputs prediction data included in the task data into the prediction model, and then obtain a prediction result output by the prediction model. The prediction result may be returned to the user's service system through the REST API.

Figure 3:
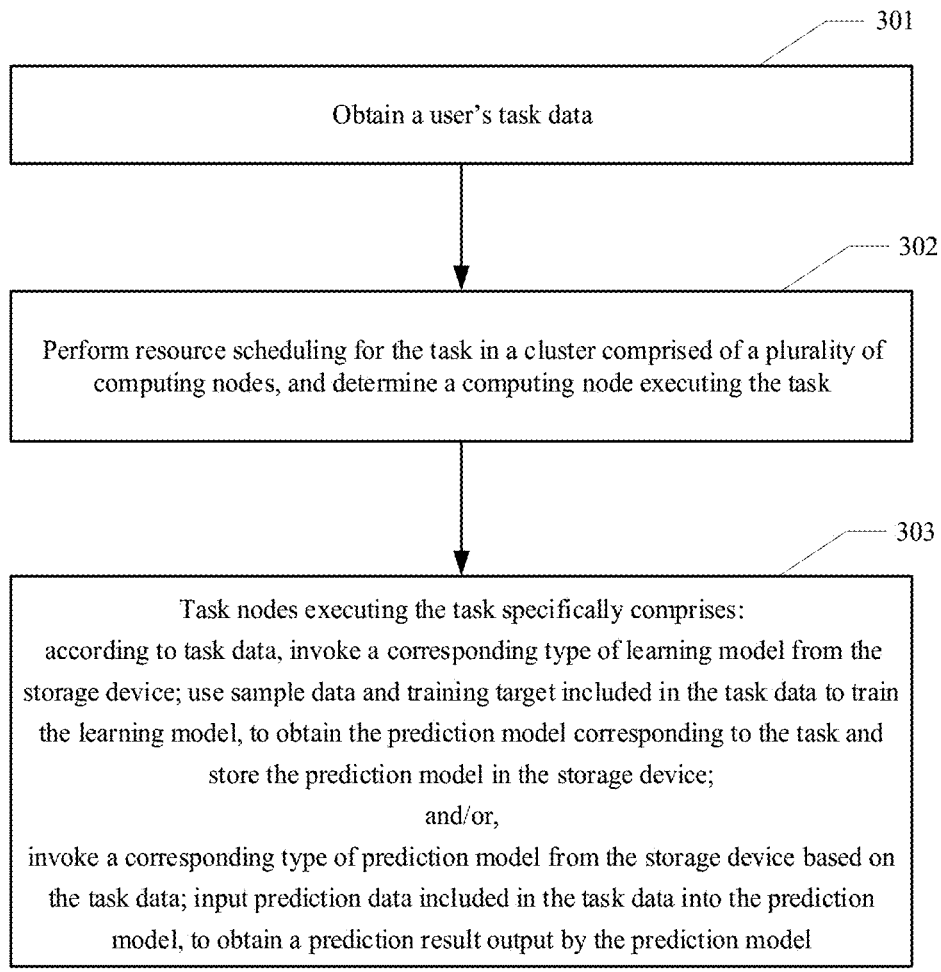
FIG. 3 is a flow chart of a method according to an embodiment of the present disclosure.

A flow chart of a method of providing intelligent big data service implemented based on the intelligent big data system may comprise the following steps as shown in FIG. 3:

At 301, obtain the user's task data.

When the user logs in the intelligent big data platform, first, the intelligent big data platform executes an initialization process for the user, and performs the following operations for the components in the cluster through the REST API:

1) Wait for an agent component on the slave nodes in the cluster to register information at the slave nodes to the master node. The registered slave node information may include for example a slave node ID, a slave node resource type, slave node resource occupation situations and so on.

2) Install and activate a HDFS component and the resource scheduling component, wherein the resource scheduling component may employ a YARN (Yet Another Resource Negotiator) component. YARN is a new Hadoop resource manager, it is a general-purpose resource management system, and may provide uniform resource management and scheduling for an upper-layer application. Introduction of YARN brings about large benefits to aspects such as utilization rate, resource uniform management and data sharing.

The user activates the cluster, namely, may use the intelligent big data service to achieve an open-and-use effect. In this step, the intelligent big data system may obtain the user's task data through the REST API. The obtained task data may be stored in the data warehouse of the intelligent big data system for subsequent use of model training and/or prediction service.

At 302, perform resource scheduling for the task in the cluster comprised of a plurality of computing nodes, and determine a computing node for executing the task.

This step may be performed by the resource scheduling component. The resource scheduling component may be located on the master node in the cluster and responsible for task allocation and resource scheduling. That is, proper computing nodes are allocated according to resource occupation situations of computing nodes to execute the task. The resource scheduling component need to be capable of recognizing and allocating heterogeneous computing resources such as CPU, GPU and FPGA. A specific policy of scheduling resources in the present disclosure is not limited.

At 303, task nodes perform the above task, specifically comprising:

according to task data, invoking a corresponding type of learning model from the storage device; using sample data and training target included in the task data to train the learning model, to obtain a prediction model corresponding to the task and store the prediction model in the storage device; and/or based on the task data, invoking a corresponding type of prediction model from the storage device; inputting prediction data included in the task data into the prediction model, to obtain a prediction result output by the prediction model.

The deep learning program may run on resources such as CPU, GPU or FPGA, preferably GPU or FPGA, and its running efficiency is usually tens of times or hundreds of times higher than the CPU.

The deep learning program may be provided by the user. It is also possible to use a deep learning program pre-configured in the intelligent big data system, and the user provides a training target.

The training process may be as shown by dotted line arrows in FIG. 2. The model training component obtains the task data from the data warehouse. In the task data, the user already designates a specific type of deep learning model. The model training component may directly invoke, from the storage device, the deep learning model of a type designated by the task data.

There is also another implementation mode. In the intelligent big data system is already configured a correspondence relationship between applications and deep learning types, that is to say, corresponding preferred deep learning types are already configured for various commonly-used applications. The user may only include application information in the training data. The model training component, according to the pre-configured correspondence relationship between the applications and deep learning model types, invoke from the storage system a type of deep learning model corresponding to application information included by the task data.

After the model training component uploads the deep learning model, sample data are used to train the deep learning model, to obtain the prediction model and store it in the distributed storage for subsequent use in prediction. In addition, the model training component may further use user-provided new training data to persistently perform model training, namely, update already-trained prediction model and thereby improve the prediction effect.

The prediction process is further shown by dotted line arrows in FIG. 2. The prediction component may obtain the task data such as prediction data, prediction program and prediction model type from the data warehouse.

Likewise, the prediction program may be provided by the user, or may employ a prediction program pre-configured in the intelligent big data system.

The prediction component invokes a duly-trained prediction model from the storage device according to the task data, and then inputs prediction data included in the task data into the prediction model, and then obtain a prediction result output by the prediction model. The prediction result may be returned to the user's service system through the prediction service (providing the user with REST API).

In addition, the user's initial sample data and subsequently persistently newly-added sample data are all stored in the data warehouse of the intelligent big data system. As the user updates the training samples, the prediction model obtained by training is updated in time and stored in the distributed storage. The prediction assembly can, when triggered or regularly, upload latest prediction models for prediction.

For example, assuming that the user needs to build a prediction model for a handwriting recognition application, after the user logs in the intelligent big data system, he collects handwriting pictures and annotates them with text results as sample data. After the task data including the sample data and application information is provided to the intelligent big data system, the intelligent big data system stores the task data in the data warehouse. Corresponding deep learning models are configured with respect to various applications in the intelligent big data system. Since picture recognition usually employs a convolutional neural network, the training component, based on application information therein, uploads the convolutional neural network from the distributed storage, and invokes sample data in the data warehouse to train the convolutional neural network to obtain a handwriting-recognizable prediction model and store it in the distributed storage.

When the user needs to recognize specific handwriting pictures, he provides the to-be-recognized handwriting pictures to the intelligent big data system as prediction data which is stored by the intelligent big data system in the data warehouse. The prediction component uploads a duly-trained prediction model from the distributed storage, and then inputs prediction data into the prediction model, and obtains and returns a recognition result to the user's service system.

Figure 4:
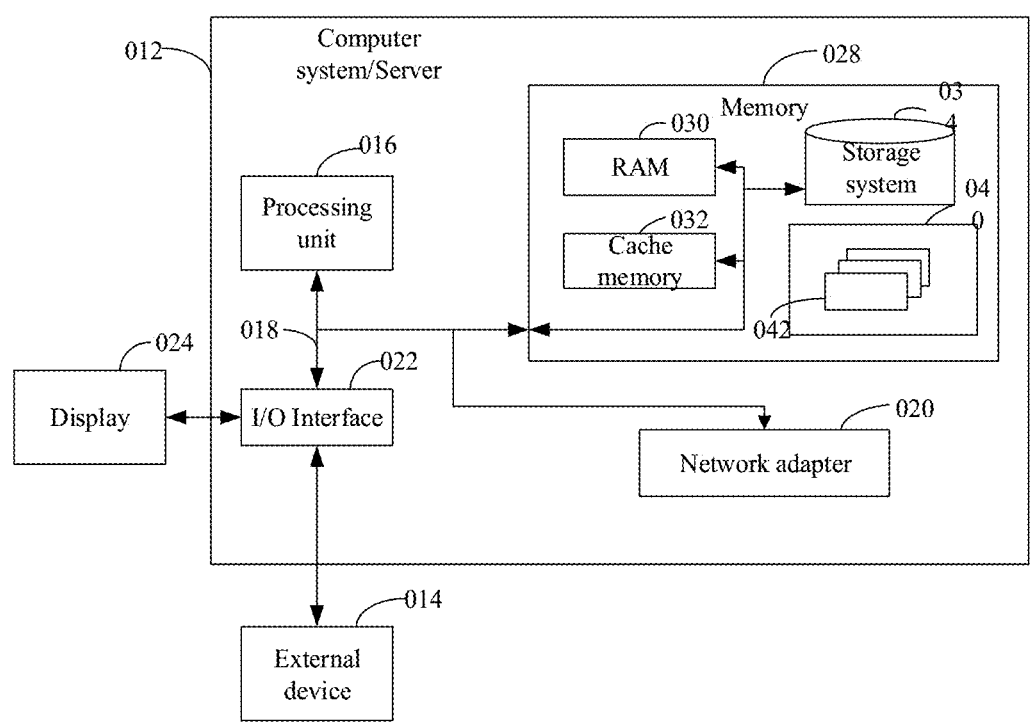
FIG. 4 is a block diagram of a computer system/server 012 according to an embodiment of the present disclosure.

The above computing nodes according to embodiments of the present disclosure may be embodied as computer systems or servers. FIG. 4 illustrates a block diagram of an example computer system/server 012 adapted to implement an implementation mode of the present disclosure. The computer system/server 012 shown in FIG. 4 is only an example and should not bring about any limitation to the function and scope of use of the embodiments of the present disclosure.

As shown in FIG. 4, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement steps of the method stated in the embodiment shown in FIG. 3. The processing unit 016 in the embodiment of the present disclosure may be one of CPU, GPU and FPGA or any combination thereof.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure. For example, steps of the method executed by said one or more processors may be steps of the method in the embodiment shown in FIG. 3.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It can be seen from the above technical solutions that the system, method and apparatus provided by the present disclosure may have the following advantages:

1) The intelligent big data system according to the present disclosure directly helps the user to establish final application-orientated service. The user may achieve model training and prediction on the intelligent big data platform by only needing to provide his own sample data, without building a software and hardware platform by himself, thereby reducing the development costs.

2) In the technical solution according to the present disclosure, the user needn't have in-depth understanding of the deep learning algorithm and architecture. The intelligent big data system, from hardware to software to service, is used as a whole platform, and reduces the threshold of knowledge of intelligent big data utilizers.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An intelligent big data system, wherein the system comprises: a data warehouse, a storage device and a cluster including a plurality of hardware computing nodes;
   the data warehouse is configured to store task data obtained from a user;
   at least one computing node in the cluster includes a resource scheduling component, and is configured to perform resource scheduling for the task and determine a computing node executing the task;
   the computing node executing the task comprises a model training component and/or a prediction component;
   the model training component is configured to, according to task data, invoke a corresponding type of learning model from the storage device; use sample data and training target included in the task data to train the learning model, to obtain the prediction model corresponding to the task and store the prediction model in the storage device;
   the prediction component is configured to, based on the task data, invoke a corresponding type of prediction model from the storage device; input prediction data included in the task data into the prediction model, to obtain a prediction result output by the prediction model;
   wherein the computing nodes in the cluster comprise: a master node and slave nodes;
   after the user logs in, the master node in the cluster activates ambari service, and perform the following operations for components in the cluster through REST API:
   waiting for an agent component on the slave nodes in the cluster to register information of the slave nodes to the master node; and
   installing and activating a Hadoop Distributed File System HDFS component and a resource scheduling component.

2. The system according to claim 1, wherein the storage device comprises: a distributed storage system.

3. The system according to claim 1, wherein the model training component and/or prediction component are located at the slave nodes.

4. The system according to claim 1, wherein the computing nodes comprise: one of CPU, Graphics Processing Unit GPU and Field-Programmable Gate Array FPGA or any combination thereof.

5. The system according to claim 1, wherein a Linux operating system is run and a Python interface library is provided on the computing nodes.

6. A method of providing intelligent big data service, wherein the method comprises:
   obtaining a user's task data;
   performing resource scheduling for the task in a cluster comprised of a plurality of computing nodes, and determining a computing node executing the task;
   executing the task on the computing node comprises:
   according to task data, invoking a corresponding type of learning model from the storage device; using sample data and training target included in the task data to train the learning model, to obtain the prediction model corresponding to the task and store the prediction model in the storage device; and/or,
   invoking a corresponding type of prediction model from the storage device based on the task data; inputting prediction data included in the task data into the prediction model, to obtain a prediction result output by the prediction model;
   after the user logs in, a master node in the cluster activates ambari service, and perform the following operations for components in the cluster through REST API:
   waiting for an agent component on slave nodes in the cluster to register information of the slave nodes to the master node; and
   installing and activating a Hadoop Distributed File System HDFS component and a resource scheduling component.

7. The method according to claim 6, wherein the obtaining a user's task data comprises: obtaining the task data from the user's service system through the REST API;
   the method further comprises: returning the prediction result to the user's service system through the REST API.

8. The method according to claim 6, wherein the invoking a corresponding type of prediction model from the storage device based on the task data comprises:
   invoking, from the storage device, a deep learning model of a type designated by the task data; or,
   according to a pre-configured correspondence relationship between applications and deep learning model types, invoking from the storage system a type of deep learning model corresponding to application information included by the task data.

9. The method according to claim 6, wherein training of the learning model is performed on CPU or FPGA resource in the computing nodes.

10. A device, wherein the device comprises:
    one or more processors;
    a storage for storing one or more programs;
    the one or more programs, when executed by said one or more processors, enable said one or more processors to implement a method of providing intelligent big data service, wherein the method comprises:

obtaining a user's task data;

performing resource scheduling for the task in a cluster comprised of a plurality of computing nodes, and determining a computing node executing the task;

executing the task on the computing node comprises:

according to task data, invoking a corresponding type of learning model from the storage device; using sample data and training target included in the task data to train the learning model, to obtain the prediction model corresponding to the task and store the prediction model in the storage device; and/or, invoking a corresponding type of prediction model from the storage device based on the task data; inputting prediction data included in the task data into the prediction model, to obtain a prediction result output by the prediction model;

after the user logs in, a master node in the cluster activates ambari service, and perform the following operations for components in the cluster through REST API:

waiting for an agent component on slave nodes in the cluster to register information of the slave nodes to the master node; and installing and activating a Hadoop Distributed File System HDFS component and a resource scheduling component.

11. The device according to claim 10, wherein the obtaining a user's task data comprises: obtaining the task data from the user's service system through the REST API;

the method further comprises: returning the prediction result to the user's service system through the REST API.

12. The device according to claim 10, wherein the invoking a corresponding type of prediction model from the storage device based on the task data comprises:

invoking, from the storage device, a deep learning model of a type designated by the task data; or, according to a pre-configured correspondence relationship between applications and deep learning model types, invoking from the storage system a type of deep learning model corresponding to application information included by the task data.

13. The device according to claim 10, wherein training of the learning model is performed on CPU or FPGA resource in the computing nodes.

14. A non-transitory storage medium including computer executable instructions, wherein the computer executable instructions, when executed by a computer processor, implement a method of providing intelligent big data service, wherein the method comprises:

obtaining a user's task data;

performing resource scheduling for the task in a cluster comprised of a plurality of computing nodes, and determining a computing node executing the task;

executing the task on the computing node comprises:

according to task data, invoking a corresponding type of learning model from the storage device; using sample data and training target included in the task data to train the learning model, to obtain the prediction model corresponding to the task and store the prediction model in the storage device; and/or, invoking a corresponding type of prediction model from the storage device based on the task data; inputting prediction data included in the task data into the prediction model, to obtain a prediction result output by the prediction model;

after the user logs in, a master node in the cluster activates ambari service, and perform the following operations for components in the cluster through REST API:

waiting for an agent component on slave nodes in the cluster to register information of the slave nodes to the master node; and installing and activating a Hadoop Distributed File System HDFS component and a resource scheduling component.

15. The storage medium according to claim 14, wherein the obtaining a user's task data comprises: obtaining the task data from the user's service system through the REST API;

the method further comprises: returning the prediction result to the user's service system through the REST API.

16. The storage medium according to claim 14, wherein the invoking a corresponding type of prediction model from the storage device based on the task data comprises:

invoking, from the storage device, a deep learning model of a type designated by the task data; or, according to a pre-configured correspondence relationship between applications and deep learning model types, invoking from the storage system a type of deep learning model corresponding to application information included by the task data.

* * * * *